United States Patent [19]
Bertram et al.

[11] Patent Number: 5,788,896
[45] Date of Patent: Aug. 4, 1998

[54] METHOD OF PRODUCING MICRON SIZED SULPHUR GRANULES

[75] Inventors: Edward Frank Bertram, Edmonton; Rodger Blackwood, DeWinton; William Chee Kay; James Kenneth Laidler, both of Edmonton, all of Canada

[73] Assignees: Alberta Research Council, Edmonton; Superfine Sulphor Inc., DeWinton, both of Canada

[21] Appl. No.: 810,985

[22] Filed: Feb. 27, 1997

[51] Int. Cl.$^6$ .................................................. B29B 9/10
[52] U.S. Cl. .................................................. 264/8; 264/14
[58] Field of Search .................................................. 264/8, 14

[56] References Cited

U.S. PATENT DOCUMENTS

| | | | |
|---|---|---|---|
| T980,005 | 3/1979 | Shirley, Jr. | 264/7 |
| 1,782,038 | 11/1930 | Haak | 264/8 |
| 3,689,227 | 9/1972 | Block | 264/14 |
| 4,043,717 | 8/1977 | Riano | 425/7 |
| 4,102,968 | 7/1978 | Caswell | 264/117 |
| 4,140,494 | 2/1979 | Coes, Jr. | 264/8 |
| 4,364,774 | 12/1982 | Elliott | 106/287.13 |
| 4,370,252 | 1/1983 | Uraueck et al. | 252/311 |
| 4,863,645 | 9/1989 | Harbolt et al. | 264/14 |

FOREIGN PATENT DOCUMENTS

| | | |
|---|---|---|
| 1151372 | 6/1983 | Canada . |
| 1186423 | 4/1985 | Canada . |
| 1208405 | 7/1986 | Canada . |
| 2043873 | 6/1991 | Canada . |
| 2050060 | 8/1991 | Canada . |
| 1314671 | 3/1993 | Canada . |
| 1336137 | 7/1995 | Canada . |

*Primary Examiner*—Mary Lynn Theisen
*Attorney, Agent, or Firm*—Anthony R. Lambert

[57] ABSTRACT

A method of producing micron sized sulphur granules involving the following described steps. Firstly, heating sulphur until the sulphur becomes molten. Secondly, tempering water and inducing movement of the water at velocity. Thirdly, injecting an unbroken stream of the molten sulphur under pressure into the heated water moving at velocity. An explosive dispersion of the molten sulphur into fine sulphur granules occurs, enhanced by shear forces exerted by the movement of the heated water at velocity. The described method is capable of producing spherical sulphur granules within a broad range of 70 microns to submicron sizes. In the preferred ranges, spherical sulphur granules of less than 10 microns are be obtained.

22 Claims, 1 Drawing Sheet

METHOD OF PRODUCING MICRON SIZED SULPHUR GRANULES

FIELD OF THE INVENTION

The present invention relates to a method of producing sulphur granules and, in particular, sulphur granules that are smaller than 45 microns.

BACKGROUND OF THE INVENTION

Sulphur granules used for agricultural purposes are generally less than 45 microns in size, with a mean granule size of approximately 20 microns. For specific applications, even smaller granule sizes may be required. For example, pesticides generally require a granule size of less than 10 microns, with a mean granule size of approximately 5 microns.

Sulphur is generally sold commercially in large slabs. U.S. Pat. No. 4,364,774 which issued to Elliot in 1982 describes a method of pelletizing the sulphur to make it easier to handle. The method involves pouring an unbroken stream of molten sulphur into a water bath. Granules can be obtained from these slabs or pellets through a grinding process, but this has inherent problems relating to dust control, fire and explosions.

U.S. Pat. No. 4,043,717 which issued to Riano in 1977 discloses a device for preparing granular sulphur from a stream of molten sulphur. The device has a spray head surrounded by an annular water jacket. Molten sulphur exits the spray head in what is referred to as a "deluge type" spray. Impingement of the water on the molten sulphur causes the sulphur to form what are described as "irregular granular pellets". This device does not create consistent size granules and produces a relatively small proportion of granules that are less than 45 microns in size.

Canadian Patent 1,151,372 which issued to Leszczynska et al in 1983 describes a method of granulation of sulphur by solidifying sulphur droplets in a counter-current air stream. The Leszczynska et al reference discloses that "92% of the grains produced are within the range of 1–5 mm in size".

Canadian Patent 1,314,671 which issued to Garcia et al in 1993 describes a method of solidifying sulphur into granules by directing jets of water and sulphur at a rotating disk. The sulphur hardens onto the disk and is broken up into granules as a result of the water striking it. The water and sulphur are then spun free of the rotating disk. However, the Garcia et al reference contains a warning that, if the droplets of sulphur are too small, there will be a great deal of fines that will be dragged away by the cooling water and large size separators will be needed to recover such sulphur out of the cooling water.

In summary, the known methods for solidifying sulphur into granules are not capable of consistently producing an output of sulphur granules, the vast majority of which are of a size of less than 45 microns.

SUMMARY OF THE INVENTION

What is required is a method that is capable of consistently producing an output of sulphur granules, the vast majority of which are of a size of less than 45 microns.

According to the present invention there is provided a method of producing sulphur granules. Firstly, heating sulphur until the sulphur becomes molten. Secondly, tempering water and inducing movement of the water at velocity. Thirdly, injecting an unbroken stream of the molten sulphur under pressure into the water moving at velocity. An explosive dispersion of the molten sulphur into fine sulphur granules occurs, enhanced by shear forces exerted by the movement of the heated water at velocity.

The method, as described above, combines high pressure injection of the molten sulphur and heated water moving at velocity to create fine granules. There is a relationship between the injection pressure and the particular size; as the injection pressure is increased, the granules size is decreased. Beneficial results have been obtained within a broad pressure range of 200 p.s.i. to 3000 p.s.i. It is generally preferred that the pressure be maintained at pressures in excess of 500 p.s.i. if a smaller particle size is desired.

Although beneficial results may be obtained through the use of the method, as described above, the temperature of the sulphur has an effect on the results obtained. It is preferred that the sulphur be heated to a temperature of between 140 degrees and 159 degrees celsius. For the best results, the sulphur should be heated within a narrower temperature range of between 150 degrees and 159 degrees celsius. At these temperatures the sulphur is molten with a minimum viscosity.

Although beneficial results may be obtained through the use of the method, as described above, the temperature of the water also has an effect on the results obtained. A broad range of between 15 degrees celsius and 98 degrees celsius is operable. When the water is maintained at cooler temperatures larger particle sizes in the 70 micron range result, when the maintenance temperature of the water is increased smaller particle sizes are obtained. It is preferred that the water be heated to a temperature of between 65 degrees and 98 degrees celsius. For the best results, the water should be heated within a narrower temperature range of between 94 degrees and 98 degrees celsius. The higher the temperature of the heated water, the smaller the particle size. It is, therefore, desirable to keep the water as hot as possible without boiling in order to obtain the smallest possible particle size.

Although beneficial results may be obtained through the use of the method, as described above, it is important that the water be maintained at a velocity sufficient to prevent agglomeration, thereby maintaining a smaller the particle size. It is preferred that the heated water be driven in a circular motion with sufficient angular velocity as to produce a vortex. The use of a vortex is a convenient and controllable manner of obtaining a high velocity water movement.

Although beneficial results may be obtained through the use of the method, as described above, an agglomeration of the fine granules tends to occur. It is, therefore, preferred that the heated water be conditioned by the addition of a surfactant. The surfactant retards agglomeration of the fine sulphur granules. The best results have been obtained through the use of carboxymethyl cellulose with a low degree of substitution.

Although beneficial results may be obtained through the use of the method, as described above, oxidation of molten sulphur produces SO2 gas. Even more beneficial effects may, therefore, be obtained when a blanket of inert gas is placed on the surface of the molten sulphur to prevent the formation of SO2 gas. Beneficial results have been obtained when the inert gas is nitrogen.

Although beneficial results may be obtained through the use of the method, as described above, the granules produced are of such a small size that recovery can be a problem. It is, therefore, preferred that a cyclone separator being used to recover the fine sulphur granules from the heated water.

3

In summary, the process described above can produce particle sizes from 70 microns down to sub-micron sizes depending upon the temperature of the water, the temperature of the sulphur, pressure of the discharging sulphur, the use of surfactants, and the rate of agitation of the target water solution.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
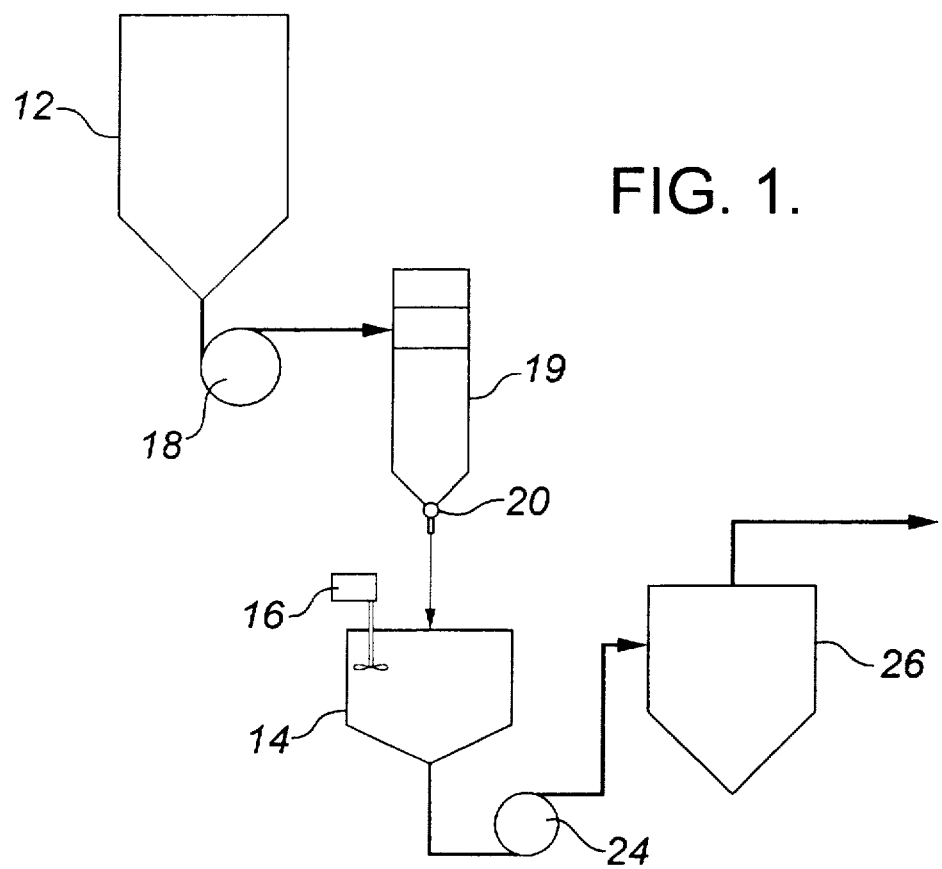
FIG. 1 is a schematic diagram of the method of producing sulphur granules according to the teachings of the present invention.
Figure 2:
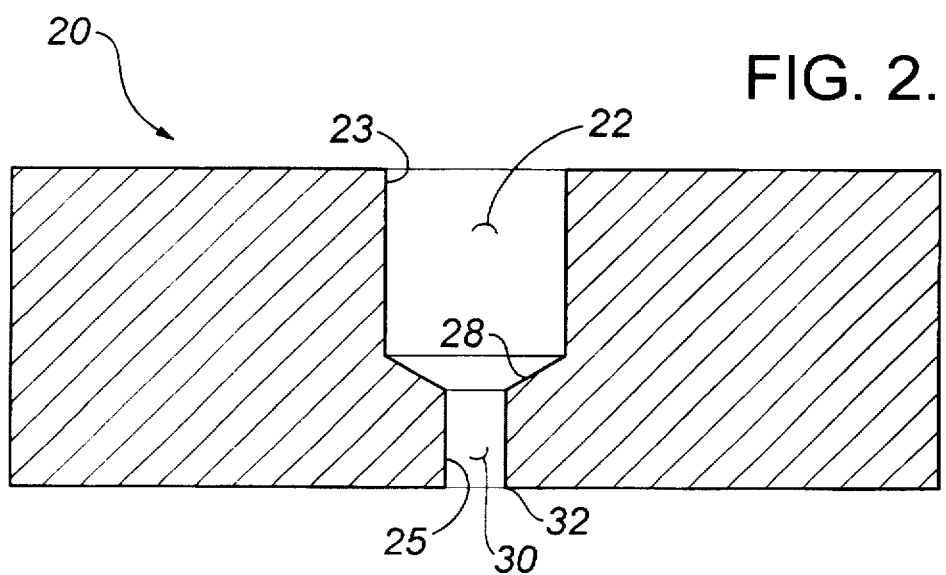
FIG. 2 is an enlarged side elevation view, in section, of a nozzle used in the method illustrated in FIG. 1.

The preferred method of producing sulphur granules will now be described with reference to FIGS. 1 and 2.

Firstly, heating sulphur in vat 12 until the sulphur becomes molten. Sulphur goes into a molten state above 119 degrees celsius. It is preferable, however, to have the molten sulphur at low viscosity. In order to obtain molten sulphur with the desired low viscosity, is it preferred that the sulphur be heated to between 140 degrees and 159 degrees celsius. When the sulphur is heated to temperatures of less than 140 degrees, the viscosity of the sulphur hinders the production of fine granules. When the sulphur is heated to temperatures of greater than 159 degrees, the extra heating is counterproductive as it results in an increase in the viscosity of the sulphur. Within the preferred temperature range of 140 degrees to 159 degrees celsius there is a narrower optimum temperature range of between 150 degrees and 159 degrees celsius. Within this narrow range the sulphur becomes molten with a minimum viscosity.

Secondly, heating water in tank 14 and inducing the movement of the water at velocity. There is a correlation between the temperature of the water and the size of the resulting sulphur granules obtained. As the temperature increases, the granules size decreases. An operable temperature range is between 15 degrees and 98 degrees centigrade. It is important, however, that the water not be brought to boiling. In most instances the preparation of the water will require heating in order to obtain the particle size desired. Rather than the term "heating", a more precise term with respect to the preparation of the water prior to injection of the molten sulphur is "tempering", as when a larger particle size is desired the water may actually have to be cooled to maintain the temperature within the lower operating ranges. A preferred temperature range being between 65 degree and 98 degrees centigrade. Within the preferred temperature range of 65 degrees to 98 degrees celsius there is a narrower optimum temperature range of between 94 degrees and 98 degrees celsius. This narrower temperature range represents the maximum operating temperature that can be maintained without bringing the water to a boil. The heated water is conditioned by the addition of a surfactant. The best results have been obtained using carboxymethyl cellulose with a low degree of substitution, less than 0.5 and, preferably, between 0.40 and 0.45. The movement of the water at velocity is induced by a stirrer 16. Stirrer 16 drives the heated water in a circular motion with sufficient angular velocity as to produce a vortex. In order to achieve beneficial results, the velocity of the water should be greater than 0.5 meters per second. It has been determined that this is the minimum velocity that the water must be moving in order to induce a feathering out of the sulphur stream. It should be noted, however, that the velocity of the water must increase as the concentration of fine particulate sulphur increases, in order to prevent sulphur from agglomerating. In other words, as higher concentrations of sulphur are contained in the solution, higher velocities must be induced in the water. The motion of the target water is essential, because if the water were stagnant the sulphur would tend to agglomerate. This problem would be further exacerbated if the vessel was shallow, as the sulphur would pile up on the bottom of the target vessel and substantial agglomerations would be produced. The use of a vortex has proven to be a convenient and controllable manner of obtaining water movement of sufficient velocity, as a threshold speed well above the minimum must be obtained and maintained to sustain a vortex.

Thirdly, injecting an unbroken stream of the molten sulphur under pressures into a periphery of the vortex. Beneficial results have been obtained with an injection pressure in a broad range of 200 p.s.i. to 3000 p.s.i., the pressure selected depending upon the particle size desired. It is preferred that the pressure be in excess of 500 p.s.i. when smaller particle sizes are desired. Two pumps 18 and 19 are employed in the process. Pump 18 is a low pressure feed pump which is used to draw molten sulphur from vat 12. Pump 19 is a high pressure pump which is used to force the molten sulphur through a nozzle 20, which is directed at the heated water in tank 14. A pump that utilizes a high pressure hydraulic cylinder is preferred for pump 19, in view of the temperature of the molten sulphur, the pressures required, and the non-lubricating nature of molten sulphur. The pump selected must be capable of generating pressures of between 200 to 3000 p.s.i. at temperatures above 119 degrees celsius to as high as 175 degrees celsius. The operating temperatures described, have been found to have an adverse effect on pump life. Beneficial results in obtaining smaller particle sizes start to be obtained at a pressure threshold of 500 p.s.i.. There is a correlation between the pressure and the size of granules produced by the method. As the pressure increases the size of the granules is reduced. For this reason, pressures closer to 2000 p.s.i. are preferred. It is important that the nozzle not be a spray nozzle. What is desired is an unbroken stream of molten sulphur. The selection of the nozzle plays an important role in keeping the size of the granules uniform. Referring to FIG. 2, there is illustrated the preferred form of discharge nozzle 20. Discharge nozzle 20 has a discharge aperture 22 having an inlet portion 23 of a first diameter and an outlet portion 25 of a second smaller diameter. There is a sloped transition zone 28 between inlet portion 23 and outlet portion 25 of discharge aperture 22. Discharge aperture 22 has a circular discharge opening 30 with a sharp edge 32 on the discharge side. Sloped transition zone 28 and sharp edge 32 both contribute to create an unbroken rapidly accelerating stream. The size of discharge opening 30 depends upon the production rate and the particle size required. Beneficial results have been obtained with discharge openings of between 0.010 to 0.050 of an inch. Depending upon the source from which the sulphur to be used is obtained, extraneous material may be contained in the sulphur. This extraneous material can block nozzle 20 and disrupt the described method. It is, therefore, recommended that the sulphur be filtered through a 100 micron filter prior to use in order to remove any extraneous material that may be present.

When the molten sulphur is injected under pressure into the heated water, an explosive dispersion of the molten sulphur into fine granules occurs. This explosive dispersion is enhanced by shear forces exerted by the vortex of heated water moving at velocity. The fine granules are feathered out in the heated water and carried away by the vortex. The high temperature of the sulphur causes the localized water to form vapour bubbles around the fine granules, keeping them apart with the aid of the surfactant, carboxymethyl cellulose. The bubbles collapse as the sulphur is cooled by the heated water. The method results in relatively uniform spherical particles of very fine or micronized sulphur.

It is preferred that vat 12 be blanketed with an nitrogen atmosphere. When oxygen in the air comes in contact with the molten sulphur in vat 12, SO2 gas is formed. When a nitrogen blanket is placed over the molten sulphur is vat 12, the nitrogen atmosphere prevents the production of SO2 gas.

The fine sulphur granules must be removed from the heated water. In order to accomplish this, a two step procedure is followed. First, pump 24 is used to divert the heated water into a cyclone separator 26 where fine sulphur granules and coarser sulphur granules are separated into two processing streams. This produces a first stream of fine sulphur granules and water, and a second stream of coarser sulphur granules and water. Second, the water is removed by filtration followed by evaporation.

The method described results in very fine micronized sulphur granules which are a relatively uniform spherical shape. Using this method sulphur granules of less than 45 microns can be obtained. When the method is run in the preferred ranges spherical sulphur granules of less than 10 microns can be obtained. The coarser sulphur granules separated out by the cyclone separator can either be recycled or used for other purposes.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as folows:

1. A method of producing sulphur granules, comprising the steps of:
   firstly, heating sulphur until the sulphur becomes molten;
   secondly, tempering water to suit a desired sulphur particle size and inducing movement of the tempered water at velocity; and
   thirdly, injecting an unbroken stream of the molten sulphur under pressure into the tempered water moving at velocity, such that an explosive dispersion of the molten sulphur into fine sulphur granules occurs, enhanced by shear forces exerted by the movement of the heated water at velocity.

2. The method as defined in claim 1, the injection pressure being within a range of 200 p.s.i. and 3000 p.s.i.

3. The method as defined in claim 2, the injection pressure being in excess of 500 p.s.i..

4. The method of producing sulphur granules as defined in claim 1, the sulphur being heated to a temperature of between 140 degrees and 159 degrees celsius.

5. The method of producing sulphur granules as defined in claim 2, the sulphur being heated to a temperature of between 150 degrees and 159 degrees celsius, such that the sulphur becomes molten with a minimum viscosity.

6. The method of producing sulphur granules as defined in claim 1, the water being tempered with a temperature range of between 15 degrees and 98 degrees celsius.

7. The method of producing sulphur granules as defined in claim 6, the water being heated within a narrower temperature range of between 65 degrees and 98 degrees celsius.

8. The method of producing sulphur granules as defined in claim 7, the water being heated within a narrower temperature range of between 94 degrees and 98 degrees celsius.

9. The method of producing sulphur granules as defined in claim 1, the heated water being driven in a circular motion with sufficient angular velocity as to produce a vortex.

10. The method of producing sulphur granules as defined in claim 1, the velocity of the heated water being at least 0.5 meters per second.

11. The method of producing sulphur granules as defined in claim 1, the heated water being conditioned by the addition of a surfactant, thereby retarding agglomeration of the fine sulphur granules.

12. The method of producing sulphur granules as defined in claim 7, the surfactant being carboxymethyl cellulose with a degree of substitution of less than 0.5.

13. The method of producing sulphur granules as defined in claim 1, a blanket of inert gas being placed over the molten sulphur, thereby retarding oxidation of the molten sulphur which produces SO2 gas.

14. The method of producing sulphur granules as defined in claim 11, the inert gas being nitrogen.

15. The method of producing sulphur granules as defined in claim 1, a cyclone separator being used to separate fine sulphur granules from coarser sulphur granules.

16. A method of producing sulphur granules, comprising the steps of:
   firstly, heating sulphur to a temperature of between 140 degrees and 159 degrees celsius, such that the sulphur becomes molten;
   secondly, heating water to a temperature of between 65 degrees and 98 degrees celsius and driving the heated water in a circular motion with sufficient angular velocity as to produce a vortex, the heated water being conditioned by the addition of a surfactant;
   thirdly, injecting an unbroken stream of the molten sulphur under pressures in excess of 500 p.s.i. into a periphery of the vortex, such that an explosive dispersion of the molten sulphur into fine granules occurs, enhanced by shear forces exerted by the movement of the heated water at velocity, the surfactant serving to prevent agglomeration of the fine sulphur granules.

17. The method of producing sulphur granules as defined in claim 16, the sulphur being heated to a temperature of between 150 degrees and 159 degrees celsius, such that the sulphur becomes molten with a minimum viscosity.

18. The method of producing sulphur granules as defined in claim 16, the surfactant being carboxymethyl cellulose with a degree of substitution of less than 0.5.

19. The method of producing sulphur granules as defined in claim 16, a blanket of nitrogen gas being placed over the molten sulphur, thereby retarding oxidation of the molten sulphur which produces SO2 gas.

20. The method of producing sulphur granules as defined in claim 16, the injection pressure being 2000 p.s.i.

21. The method of producing sulphur granules as defined in claim 16, the water being heated to a temperature of between 94 degrees and 98 degrees celsius.

22. A method of producing sulphur granules, comprising the steps of:
   firstly, heating sulphur to a temperature of between 150 degrees and 159 degrees celsius, such that the sulphur becomes molten with a minimum viscosity;
   secondly, heating water to a temperature of between 94 degrees and 98 degrees celsius and driving the heated water in a circular motion with sufficient angular velocity as to produce a vortex, the heated water being conditioned by the addition of carboxymethyl cellulose with a degree of substitution of less than 0.5;

thirdly, injecting an unbroken stream of the molten sulphur under pressures of approximately 2000 p.s.i. into a periphery of the vortex, such that an explosive dispersion of the molten sulphur into fine granules occurs, enhanced by shear forces exerted by the movement of the heated water at velocity, the carboxymethyl cellulose serving to retard agglomeration of the fine sulphur granules;

fourthly, separating fine sulphur granules from coarser sulphur granules by passing the heated water containing sulphur granules through a cyclone separator; and fifthly, recovering the fine sulphur granules from the heated water through filtration followed by evaporation.

* * * * *